(12) United States Patent
Maier et al.

(10) Patent No.: US 12,409,723 B2
(45) Date of Patent: Sep. 9, 2025

(54) VENTING DEVICE

(71) Applicant: Bayerische Motoren Werke Aktiengesellschaft, Munich (DE)

(72) Inventors: Bernhard Maier, Bruckberg (DE); Peter Streng, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 477 days.

(21) Appl. No.: 17/915,206

(22) PCT Filed: May 20, 2021

(86) PCT No.: PCT/EP2021/063418
§ 371 (c)(1),
(2) Date: Sep. 28, 2022

(87) PCT Pub. No.: WO2021/254718
PCT Pub. Date: Dec. 23, 2021

(65) Prior Publication Data
US 2023/0116887 A1    Apr. 13, 2023

(30) Foreign Application Priority Data
Jun. 18, 2020   (DE) .................... 10 2020 116 049.6

(51) Int. Cl.
*B60K 11/06* (2006.01)
*F16H 57/027* (2012.01)

(52) U.S. Cl.
CPC ............ *B60K 11/06* (2013.01); *F16H 57/027* (2013.01)

(58) Field of Classification Search
CPC .................. F16H 57/027; B60K 11/06; F01M 2013/0016; F01M 2013/0038; F01M 13/0033; F01M 13/0044; F16K 24/00
See application file for complete search history.

(56) References Cited

U.S. PATENT DOCUMENTS 6,994,621 B2 *  2/2006  Mashiko ............... H02K 5/10
                                                     362/345
7,213,582 B2 *  5/2007  Treudt ............... F02M 25/0836
                                                     123/516
(Continued)

FOREIGN PATENT DOCUMENTS

CN      101424465 A    5/2009
CN      202158702 U    3/2012
(Continued)

OTHER PUBLICATIONS

German-language Office Action issued in German Application No. 10 2020 116 049.6 dated Mar. 8, 2024 (6 pages).
(Continued)

*Primary Examiner* — Thomas C Diaz
(74) *Attorney, Agent, or Firm* — Crowell & Moring LLP

(57) ABSTRACT

A venting device for a motor vehicle drive component is provided with an air feed device which has an air guiding region, by way of which the air feed device can be connected in a fluid-conducting manner to an interior chamber to be vented, and with a membrane vent which has a venting membrane which is permeable to water vapor in a first flow direction and which is impermeable to water vapor in a second flow direction. The membrane vent is connected at least temporarily in a fluid-conducting manner to the air guiding region, wherein an inlet air direction is directed through an imaginary flow direction out of the surroundings which surround the venting device, through the venting membrane and to the air guiding region, and wherein the venting membrane is arranged in an air guide housing such that it is impermeable to water vapor in the inlet air direction. An inlet air shut-off valve is arranged downstream of the venting membrane and upstream of the air guiding region in the inlet air direction. A fluid flow from the air (Continued)

guiding region to the venting membrane, that is to say counter to the inlet air direction, can be prevented by way of the inlet air shut-off valve.

6 Claims, 1 Drawing Sheet

(56) References Cited

U.S. PATENT DOCUMENTS

| | | | |
|---|---|---|---|
| 10,948,068 B2 * | 3/2021 | Tesner | F16H 57/027 |
| 11,539,261 B2 * | 12/2022 | Aoki | F16K 24/06 |
| 2008/0207110 A1 * | 8/2008 | Guichaoua | F16H 57/027 |
| | | | 74/606 A |
| 2013/0154413 A1 | 6/2013 | Schweichart et al. | |
| 2014/0326104 A1 | 11/2014 | Heyne et al. | |
| 2017/0187018 A1 | 6/2017 | Pflueger et al. | |
| 2018/0263126 A1 | 9/2018 | Kerner et al. | |
| 2019/0032528 A1 | 1/2019 | Sprickmann Kerkerinck et al. | |
| 2019/0271384 A1 | 9/2019 | Tesner et al. | |
| 2021/0010582 A1 | 1/2021 | Koerber et al. | |

FOREIGN PATENT DOCUMENTS

| | | | |
|---|---|---|---|
| CN | 103174356 A | 6/2013 | |
| CN | 104033574 A | 9/2014 | |
| CN | 107004803 A | 8/2017 | |
| CN | 109072737 A | 12/2018 | |
| DE | 10 2015 214 923 A1 | 2/2017 | |
| DE | 10 2018 205 053 A1 | 10/2019 | |
| DE | 10 2018 207 442 A1 | 11/2019 | |
| DE | 102018111850 A1 * | 11/2019 | F16K 24/00 |

OTHER PUBLICATIONS

International Search Report (PCT/ISA/210) issued in PCT Application No. PCT/EP2021/063418 dated Aug. 3, 2021 with English translation (four (4) pages).

German-language Written Opinion (PCT/ISA/237) issued in PCT Application No. PCT/EP2021/063418 dated Aug. 3, 2021 (eight (8) pages).

German-language Search Report issued in German Application No. 10 2020 116 049.6 dated Mar. 16, 2021 with partial English translation (11 pages).

Chinese-language Office Action issued in Chinese Application No. 202180024886.1 dated Mar. 5, 2025 with English translation (16 pages).

* cited by examiner

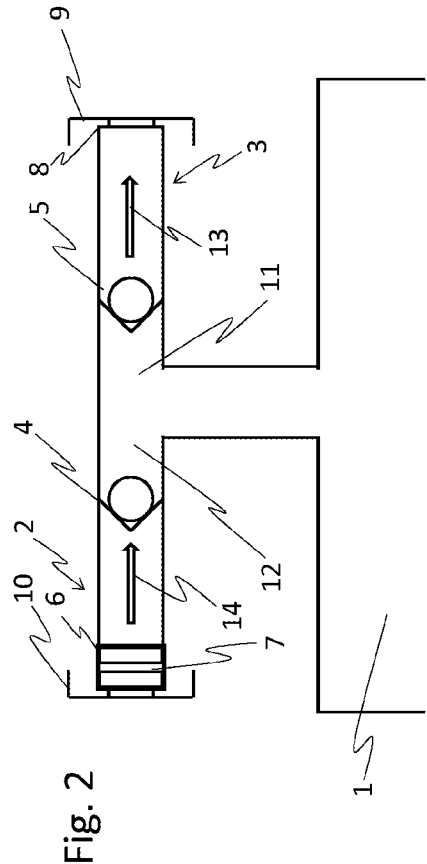
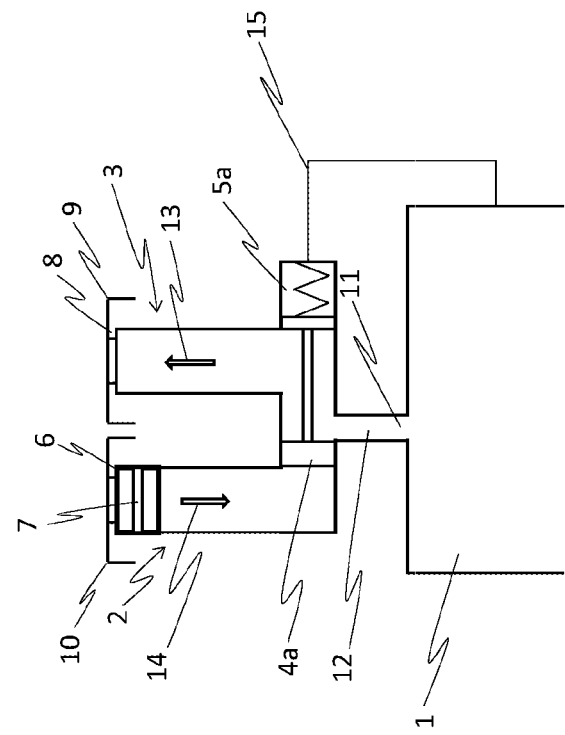
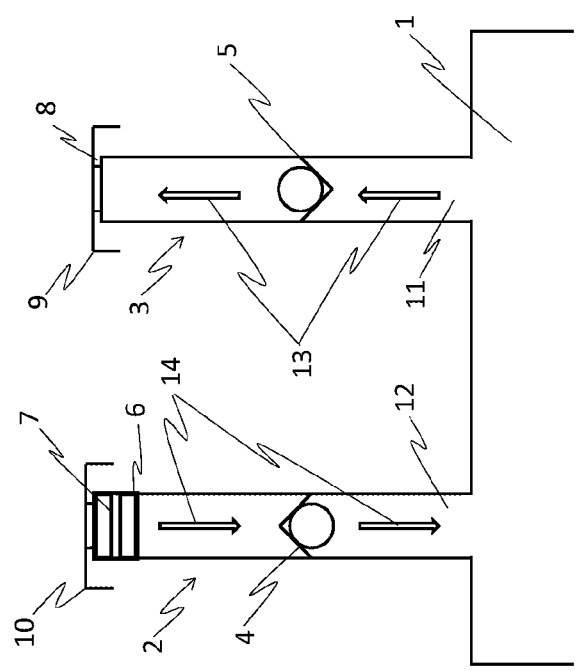

ively or permanently to the drive wheels via a transmission.
VENTING DEVICE

BACKGROUND AND SUMMARY

The invention relates to a venting apparatus, in particular for a transmission in a motor vehicle.

DE 10 2015 214 923 A1 is concerned with a pressure-equalization element and a housing having such a pressure-equalization element.

Below, the invention is described on the basis of a venting apparatus in a motor-vehicle transmission, this not being intended to be understood as being a restriction of the invention to such a use. In a motor vehicle, the traction motor, that is to say the drive motor for providing drive power for overcoming driving resistances, is permanently or selectively coupled to the drive wheels via a transmission. Irrespective of whether said transmission has a fixed transmission ratio or is switchable, it is exposed to high temperature fluctuations, which necessitate pressure equalization of the transmission interior space with respect to the environment surrounding the transmission. In order to allow such pressure equalization, such a transmission has at least one venting apparatus. One type of construction of such a venting apparatus is a so-called membrane vent, wherein the membrane is impermeable to water but permeable to air, this therefore exhibiting the functional principle of so-called sport clothing or functional clothing. In the transmission, there is formed, in particular owing to the movement of components in the transmission, such as the transmission shaft and gearwheels, a so-called aerosol, that is to say a mixture of air and fine lubricant droplets. The lubricant droplets can be deposited or accumulate at the membrane when air passes through from the transmission interior space, this being undesired since this can impair the functioning of the venting apparatus.

It is an object of the invention to provide a venting apparatus having a venting membrane with improved functional reliability.

Within the context of the invention, a venting apparatus is to be understood as being an apparatus for allowing pressure equalization between an interior space which is arranged in a housing and an environment which surrounds said housing. Preferably, the housing is a housing of a motor-vehicle drive component, preferably of a motor-vehicle transmission or of a drive motor, and furthermore preferably of an electric drive motor. In particular, the motor-vehicle drive component is at least partially filled with a fluid, preferably an engine or transmission oil. In particular during the operation of the motor-vehicle drive component, there is formed in the interior space to be vented, in which said fluid is at least intermittently accommodated, a so-called aerosol.

Here, in this context, an aerosol is to be understood as being air containing fine fluid drops, preferably fine lubricant droplets. For a flow typically occurring during pressure equalization for said interior space, said flow leads, in the case of a positive pressure in the interior space with respect to an environment surrounding the motor-vehicle drive component, to an aerosol flow from the interior space into said environment, wherein such an (aerosol) flow entrains fine lubricant droplets.

Preferably, the venting apparatus has at least one air-feed device, that is to say a device by means of which pressure equalization between an environment which surrounds the motor-vehicle drive component and an interior space of said motor-vehicle drive component is allowed, in particular if a higher pressure prevails in the environment than in the interior space to be vented. Furthermore preferably, the air-feed device is accordingly configured to allow an air flow from the environment surrounding the motor-vehicle drive component into the interior space of the latter. Furthermore preferably, in addition to the air-feed device, the venting apparatus also has an air-discharge device, wherein these two devices may be arranged in a spatially separated manner at the motor-vehicle drive component and thus configured as spatially separated devices, and in another embodiment these two devices may preferably be integrated in a one-part or preferably multi-part air-feed housing.

The air-feed device has in particular a so-called air-guide region, by way of which the air-feed device is at least intermittently or permanently connected in a fluid-conducting manner to an interior space to be vented, in particular of the motor-vehicle drive component. Furthermore, the air-feed device has a membrane vent. Preferably, the membrane vent is configured to reduce or preferably to prevent an ingress of moisture via the air-feed device into the interior space to be vented. The membrane vent has in particular a venting membrane for providing this functionality. Such a venting membrane exhibits at least substantially the functional principle of functional clothing with water-repellent properties from "outside" to "inside". The venting membrane is accordingly permeable to water or water vapor in a first flow direction and impermeable to water or water vapor in a second flow direction. Furthermore, the membrane vent is at least intermittently connected in a fluid-conducting manner to the air-guide region such that pressure equalization is allowed at least for certain pressure conditions between the interior space to be vented and the environment surrounding the motor-vehicle drive component.

Within the context of the invention, a supply-air direction is to be understood as being an imaginary flow direction from the environment surrounding the venting apparatus, through the venting membrane and to the air-guide region. Furthermore, the venting membrane is arranged in an air-guide housing in such a way that said venting membrane is impermeable to water vapor in the supply-air direction. In particular by means of such an arrangement of the venting membrane, it is possible for penetration of moisture from the surroundings into the inner space to be vented via the venting apparatus to be prevented.

The air-feed device has a supply-air shut-off valve, which is preferably in the form of a supply-air shut-off valve, by way of which a fluid flow through this valve is prevented in a flow direction and is allowed in the opposite direction. The supply-air shut-off valve is arranged downstream of the venting membrane and upstream of the air-guide region in the supply-air direction and, furthermore, is in this case arranged or actuated in such a way that a fluid flow from the air-guide region to the venting membrane, that is to say counter to the supply-air direction, is prevented by said supply-air shut-off valve. In particular by means of such a configuration of the invention, passing of aerosol from the interior space to be vented to the venting membrane via the air-guide region is prevented, and a negative effect of the aerosol on the venting membrane is thus prevented and the functional reliability of the venting apparatus is thus improved.

It is furthermore preferably the case that, beside or in addition to the air-feed device, provision is made of an air-discharge device, which allows in particular pressure equalization in a situation in which a higher pressure prevails in the interior space to be vented of the motor-vehicle drive component than in the environment surrounding the venting apparatus. In order to allow in particular the aforementioned functionality, the air-discharge device has at least one air-exit opening and preferably a multiplicity thereof. Preferably, such an air-outlet opening is formed as a cutout in the air-feed device. In particular via the at least one air-discharge device, the possibility for air to be delivered from the venting apparatus to the environment surrounding the latter is allowed, in other words the air-discharge device is connected in a fluid-conducting manner to the environment surrounding the air-discharge device via said air-exit opening. Furthermore, the air-discharge device has an air-discharge region, by way of which the air-discharge device can be connected in a fluid-conducting manner to the interior space to be vented. In the air-discharge device, an imaginary flow direction is defined as a so-called exhaust-air direction, which is directed from the air-discharge region to the at least one air-exit opening.

Furthermore, an exhaust-air shut-off valve is arranged upstream of the air-exit opening and downstream of the air-discharge region in the exhaust-air direction, said exhaust-air shut-off valve preferably being in the form of an exhaust-air check valve. By way of such an exhaust-air shut-off valve, a flow of a fluid in the air-discharge device can be prevented in one direction and is allowed in the other direction, which is opposite the first direction. The exhaust-air shut-off valve is accommodated or actuated in the air-discharge device in such a way that a fluid flow from the at least one air-exit opening toward the air-discharge region, that is to say counter to the exhaust-air direction, is prevented and, furthermore preferably, a fluid flow through the exhaust-air shut-off valve in the exhaust-air direction is allowed.

In particular by means of such a configuration of the venting apparatus, it has two paths for connection of the interior space to be vented to the environment surrounding the venting apparatus, wherein, in each of these paths (air-feed device, air-discharge device), only one flow direction is allowed, and wherein the flow directions in the two paths are opposite such that, as a result, the venting membrane is not loaded with aerosol and reliable pressure equalization is made possible.

In a preferred embodiment, the air-discharge region of the air-discharge device and the air-guide region of the air-feed device are formed at least sectionally as a common region, and furthermore preferably said regions are integrated into a common air-guide housing or are formed therein or are preferably to be regarded as a common region therein. As discussed, an air flow through the venting apparatus arises owing to the pressure conditions in the interior space to be vented, which is connected in a fluid-conducting manner to the air-discharge region and the air-feed region, and in the environment surrounding the venting apparatus, so that such a common region functions either as air-discharge region or as air-feed region. A particularly space-saving construction of the venting apparatus is made possible in particular by means of such an integrated design.

In a preferred embodiment, at least one of said shut-off valves, that is to say the supply-air shut-off valve or the exhaust-air shut-off valve or preferably both, is in the form of a so-called check valve, that is to say in the form of a supply-air check valve or in the form of an exhaust-air check valve. In a further preferred embodiment, at least one of said check valves is in the form of a so-called mushroom valve. In this context, a mushroom valve refers to a valve device having a valve body which comprises an elastomer as a constituent or which consists thereof and which has a holding section by way of which the valve body is held opposite a valve seat. Furthermore, at least one throughflow opening can be closed off by the valve body, and furthermore the throughflow opening can be closed off in such a way that a flow through it is allowed only in one flow direction, and is prevented by the valve body in the other flow direction. A so-called mushroom valve is known per se from the prior art and exhibits high functional reliability.

In a preferred embodiment, the two devices, that is to say the air-feed device and the air-discharge device, have a common valve body, by way of which in each case one flow path can be closed off and the other one can be opened up. In such an embodiment, said valve body can preferably be moved back and forth between a first end position and a second end position, wherein, in the first end position, a flow through the air-feed device in the supply-air direction is prevented and a flow through the air-discharge device in the exhaust-air direction is allowed and, in the other end position, a flow through the air-feed device in the supply-air direction is allowed and a flow through the air-discharge device in the exhaust-air direction is prevented. In other words, the movable valve body makes it possible to permit a flow in the discharge-air direction, and to block a flow in the supply-air direction, in the venting apparatus when said valve body is in one end position and to permit a flow in the supply-air direction, and to block a flow in the discharge-air direction, in the venting apparatus when said valve body is in the other end position.

Individual features of the invention and preferred embodiments thereof are discussed in more detail below on the basis of the figures, other feature combinations than those illustrated also being possible here.

BRIEF DESCRIPTION OF THE DRAWINGS

FIG. 1 schematically shows a first embodiment of the venting apparatus in a sectional illustration;
FIG. 2 schematically shows a second embodiment of the venting apparatus in a sectional illustration; and
FIG. 3 schematically shows a third embodiment of the venting apparatus in a sectional illustration.

DETAILED DESCRIPTION OF THE DRAWINGS

The embodiment of the invention illustrated in FIG. 1 constitutes an embodiment of the invention in which the air-feed device 2 and the air-discharge device 3, which provide for the pressure equalization with respect to the environment surrounding the venting apparatus of the interior space 1 to be vented, are structurally separated from one another. In the case of a higher pressure in the surroundings than in the interior space 1 to be vented, air flows through the air-feed device 2 in the supply-air direction 14 by way of the supply-air protective cap 10, via the membrane vent 6 and, in this, by way of the venting membrane 7. For controlling the flow through the air-feed device 2, the supply-air check valve 4 is inserted into it in such a way that a flow through it is possible only in the supply-air direction 14 and is prevented in the opposite direction. Although aerosol, as can be formed in the interior space 1 to be vented by the churning of components such as gear wheels, can enter the air-guide region 12 of the air-feed device 2, onward flow to the membrane vent 6 with the vent 7 is then prevented by the supply-air check valve 4, so that said venting membrane is protected against loading with drops, in particular lubricant droplets, from the aerosol.

The venting apparatus furthermore has the air-discharge device 3, through which a flow in the exhaust-air direction 13 is allowed and counter to this direction is prevented by the exhaust-air check valve 5. In the case of positive pressure in the interior space 1 to be vented with respect to the environment surrounding the venting apparatus, air flows from said interior space 1 via the air-discharge region 11, through the exhaust-air check valve 5, through the air-exit opening 8, and through the exhaust-air protective cap 9 and out of the air-discharge device 3.

FIG. 2 illustrates a further embodiment of the venting apparatus, and in this case mainly the differences from the embodiment illustrated in FIG. 1 will be discussed below.

The air-guide region 12 and the air-discharge region 11 are structurally combined with one another, so that the venting apparatus is integrated into a common housing to vent the interior space 1, that is to say to establish pressure equalization with respect to the environment surrounding the venting apparatus. The air-discharge device 3 has an exhaust-air check valve 5, which allows a flow through the air-discharge device 3 in the exhaust-air direction 13 but prevents such a flow counter to said direction.

The air-feed device 2 has the membrane vent 6 with venting membrane 7, wherein the venting membrane 7 is protected against loading with aerosol by means of the supply-air check valve 4, since the supply-air check valve 4 allows a flow in the supply-air direction 14 and prevents such a flow counter to said direction.

FIG. 3 illustrates a further embodiment of a venting apparatus, wherein this is in the form of an air-pressure-controlled supply-air shut-off valve with an exhaust-air shut-off valve integrated therein, it also being possible for this to be understood as being a valve with three ports and two switching positions, that is to say as being a 3/2-way valve. Here, the control chamber 5a is connected by way of a control line 15 to the interior space 1 to be vented. By means of a spring element, the valve body 4a is displaced into an end position, so that a flow from the interior space to be vented via the air-guide region 12, which is likewise formed jointly with the air-discharge region here, and through the air-exit opening 8 and the exhaust-air protective cap 9 is allowed.

If, during the operation of the drive component or after the operation of the drive component, the pressure in the interior space 1 drops in relation to the pressure in the surroundings, then the valve body 4a is moved, owing to the negative pressure in the control chamber, into a position in which the flow path through the air-discharge device 3 is blocked and the flow path through the air-feed device 2 in the supply-air direction 14 is opened up. Here, other ways of applying pressure to the valve body than those illustrated are possible. In this embodiment, the supply-air shut-off valve or the exhaust-air shut-off valve functions as a switch that opens up one of two possible flow paths and blocks the second one.

List of Reference Signs
 1 Interior space to be vented
 2 Air-feed device
 3 Air-discharge device
 4 Supply-air check valve
 4a Valve body
 5 Exhaust-air check valve
 5a Control chamber
 6 Membrane venting means
 7 Venting membrane
 8 Air-exit opening
 9 Exhaust-air protective cap
 10 Supply-air protective cap
 11 Air-discharge region
 12 Air-guide region
 13 Exhaust-air direction
 14 Supply-air direction
 15 Pressure control line

The invention claimed is:

1. A venting apparatus for a motor-vehicle drive component, comprising:
 an air-feed device which has an air-guide region, by way of which air-guide region the air-feed device is connectable in a fluid-conducting manner to an interior space to be vented;
 a membrane vent which has a venting membrane, said venting membrane being permeable to water vapor in a first flow direction and being resistant to permeation of water vapor in a second flow direction; and,
 an air-discharge device, wherein:
  the membrane vent is at least intermittently connected in a fluid-conducting manner to the air-guide region,
  a supply-air direction is a flow direction from an environment surrounding the venting apparatus, through the venting membrane and to the air-guide region, and
  the venting membrane is arranged in an air-guide housing in such a way that said venting membrane is resistant to permeation of water vapor in the supply-air direction;
  a supply-air shut-off valve is arranged downstream of the venting membrane and upstream of the air-guide region in the supply-air direction,
  a fluid flow counter to the supply-air direction from the air-guide region to the venting membrane is prevented by said supply-air shut-off valve;
  the air-discharge device has at least one air-exit opening via which air is deliverable to the environment surrounding the venting apparatus,
  the air-discharge device has an air-discharge region, by way of which the air-discharge device is connectable in a fluid-conducting manner to the interior space to be vented,
  an exhaust-air direction in the air-discharge device is a flow direction from the air-discharge region to the at least one air-exit opening;
  an exhaust-air shut-off valve is arranged upstream of the air-exit opening and downstream of the air-discharge region in said exhaust-air direction,
  a fluid flow from the at least one air-exit opening to the air-discharge region is prevented by said exhaust-air shut-off valve,
  the supply-air shut-off valve and the exhaust-air shut-off valve have a common valve body which is movable in response to a change in pressure in the interior space between at least two end positions such that (i) in a first end position, a flow in the air-discharge device in the exhaust-air direction is allowed and a flow in the air-feed device in the supply-air direction is blocked, and (ii) in a second end position, a flow in the air-feed device in the supply-air direction is allowed and a flow in the air-discharge device in the exhaust-air direction is blocked.

2. The venting apparatus for a motor-vehicle drive component according to claim 1, wherein
 the air-discharge region and the air-guide region are formed at least sectionally as a common region, and
 the air-exit opening is formed as a cutout in the air-feed housing.

3. The venting apparatus according to claim 1, wherein at least one of the shut-off valves is a check valve.

4. The venting apparatus for a motor-vehicle drive component according to claim 3, wherein
the at least one check valve is a mushroom valve.

5. The venting apparatus according to claim 1, wherein
the supply-air shut-off valve is a supply-air check valve, and
the exhaust-air shut-off valve is an exhaust-air check valve.

6. The venting apparats according to claim 1, further comprising a spring housed in a control chamber in fluid communication with the internal space, wherein the common valve body is operatively connected to the spring.

* * * * *